(12) United States Patent
Ramsay

(10) Patent No.: US 7,059,608 B2
(45) Date of Patent: Jun. 13, 2006

(54) INSTALLATION AND DEPLOYMENT SLEEVES FOR LIP SEALS

(75) Inventor: Thomas W. Ramsay, Waterloo (CA)

(73) Assignee: Ashbridge & Roseburgh Inc., Ontario (CA)

( * ) Notice: Subject to any disclaimer, the term of this patent is extended or adjusted under 35 U.S.C. 154(b) by 396 days.

(21) Appl. No.: 10/387,730

(22) Filed: Mar. 13, 2003

(65) Prior Publication Data

US 2003/0173746 A1 Sep. 18, 2003

Related U.S. Application Data

(60) Provisional application No. 60/364,163, filed on Mar. 13, 2002, and provisional application No. 60/364,176, filed on Mar. 13, 2002.

(51) Int. Cl.
*F16J 15/32* (2006.01)

(52) U.S. Cl. .................... 277/551; 277/572
(58) Field of Classification Search ........... 277/459, 277/551, 569, 572–573, 576–577
See application file for complete search history.

(56) References Cited

U.S. PATENT DOCUMENTS

| | | | | |
|---|---|---|---|---|
| 2,405,120 | A | * | 8/1946 | Evans ................ 29/271 |
| 2,836,441 | A | | 5/1958 | Doble |
| 3,413,008 | A | | 11/1968 | Greiner |
| 3,434,727 | A | | 3/1969 | Kollenberger |
| 3,698,724 | A | | 10/1972 | Blachere et al. |
| 3,727,923 | A | | 4/1973 | McEwen |
| 3,773,336 | A | | 11/1973 | Walter et al. |
| 4,008,897 | A | | 2/1977 | Wentworth |
| 4,218,813 | A | * | 8/1980 | Cather, Jr. ................ 29/450 |
| 5,052,695 | A | | 10/1991 | Curtis |
| 5,460,386 | A | | 10/1995 | McCoy et al. |
| 5,503,404 | A | * | 4/1996 | Newton et al. ............ 277/551 |
| 5,820,132 | A | | 10/1998 | Marnot |
| 6,098,990 | A | | 8/2000 | Marnot |
| 6,152,454 | A | | 11/2000 | Marnot |

FOREIGN PATENT DOCUMENTS

| | | |
|---|---|---|
| DE | 23 52 944 | 4/1975 |
| DE | 36 10226 | 6/1987 |
| WO | WO 01/79729 A1 | 10/2001 |

OTHER PUBLICATIONS

International Search Report mailed Aug. 6, 2001, corresponding to PCT/IB 01/00821.
Copies of claims, Office Action, and Amendment from co-pending U.S. Appl. No. 10/312,020.

* cited by examiner

*Primary Examiner*—Alison Pickard
*Assistant Examiner*—Vishal Patel
(74) *Attorney, Agent, or Firm*—Marshall, Gerstein & Borun LLP

(57) ABSTRACT

This invention relates to a seal cartridge comprising at least two back-to-back lip seals. A first, generally L-shaped sleeve is applied against the back wall of the seal ring such that its axially extending cylindrical surface retracts the lip portion of the outboard seal into a non-deployed position. A second, generally L-shaped sleeve is fitted up against the back of the first sleeve so as to place the lip end of the inboard seal in a similarly raised or retracted position. Upon installation of the seal ring about the shaft and in the shaft housing, the second, innermost sleeve is removed, such that the inboard lip seal is deployed against the surface of the shaft. Upon detection of leakage past the inboard seal, the first sleeve is retracted to thus deploy the remaining outboard lip seal.

4 Claims, 8 Drawing Sheets

INSTALLATION AND DEPLOYMENT SLEEVES FOR LIP SEALS

CROSS REFERENCE TO RELATED APPLICATION

This application claims priority of U.S. provisional application, Ser. No. 60/364,163, filed Mar. 13, 2002, by Ramsay, entitled "SLEEVE INSTALLATION AND DEPLOYMENT OF LIP SEALS" and U.S. provisional application, Ser. No. 60/364,176, filed Mar. 13, 2002, by Ramsay, entitled "SLEEVE INSTALLATION AND DEPLOYMENT OF LIP SEAL".

FIELD OF THE INVENTION

This invention is concerned with the use of annular, lipped seals around a rotating or reciprocating shaft that penetrates a machine case or body. Such seals serve to close the annular gap between the stationary case or body part and the rotating or reciprocating shaft. For example, lipped oil seals are typically used around rotating shafts in internal combustion engines and are often used to prevent the leakage of the process fluid, such as water or a water-based mixture, along the shaft operating a pump. This invention relates to the installation and selective deployment of lip seal members about an annular moving part, such as a rotating or reciprocating shaft.

BACKGROUND OF THE INVENTION

It is important that an annular, lipped seal or lip seal be fitted centrally in the gap to be sealed, with the support for the external circumference of the seal being properly centered relative to the shaft centerline. The function of the lip seal will be lost or negatively affected if the gap is wider on one side than the other. In U.S. Pat. Nos. 5,013,050 and 5,052,695, assigned to Ford Motor Company, tools for supporting and installing a lip seal in a gap in a device, such as an oil seal around a rotating shaft, are disclosed where the interior, lip portion of the seal is flexed into a retracted state about an axially extending cylindrical surface, or sleeve, connected to an outer plate which extends radially outward of the seal. The radially extending outer plate of the tool is particularly adapted to engage with the end plate or housing body of the machine to act as a centering guide upon axial insertion of the retracted lip seal into the gap between the shaft and the stationary casing or body of the machine. The seal is assembled into the gap by interference fit with the inner diameter of the machine's shaft housing. With the seal thus being installed about the shaft, the tool is axially withdrawn, causing the interior lip to flex radially inward into engagement with the shaft. The tool, which may be made of plastic, may then be discarded.

In operation, lip seals have a limited useful life due to wear. At the end of the useful life, leakage will develop at the interface between the stationary lip seal and the reciprocating/rotating shaft. When leakage is observed, the operation of the fluid handling machine generally must be terminated and the machine at least partially dismantled to remove the previous lip seal for purposes of replacement. There is the possibility that a significant cost in operating downtime may be suffered due to the replacement of the lip seal.

Various approaches have been undertaken to improve the performance and/or to lengthen service periods between required maintenance. Thus, for example, U.S. Pat. No. 2,836,441 to Doble discloses a shaft seal system in which the shaft includes a conical surface and the seal is axially repositionable along the shaft to improve engagement between the seal and the shaft as the seal experiences wear. U.S. Pat. No. 3,773,336 to Walter discloses a seal system in which a spare seal member is initially positioned adjacent a recess in the shaft (or associated bushing), thereby avoiding engagement with the shaft until needed. The spare seal member may be brought into contact with the shaft by axially repositioning the seal holder or the shaft/bushing. U.S. Pat. Nos. 5,820,132 and 6,152,454 to Marnot also describe seal systems in which a spare seal is initially positioned adjacent a set back region formed in the shaft. As the spare seal is axially repositioned so as to be brought into engagement with the shaft, the replaced seal is moved adjacent a set back region formed in the shaft, i.e., out of engagement with the shaft.

The inventor has devised a more economical sleeve-type system for the simplified, yet reliable, installation of a lip seal or seals into the gap about a shaft to enable the shaft to be sealed during operation of the machine. Additionally, the inventor has devised a back-up or spare seal capability to extend useful wear life of the sealing operation.

SUMMARY OF THE INVENTION

In a first aspect of the present invention, there is provided a seal cartridge in the form of a ring containing an annular lipped seal or lip seal. The seal ring is formed with an inboard, radial front wall connected to an axially extending containment wall, which serves as the outer diameter wall surrounding the lip seal carried by the ring, and ending with an outboard radially extending backplate. The backplate extends radially inward in parallel with the annular extent of the lip seal to a point short of the radial extent to which the lip portion of the seal will extend into contact with the shaft.

A generally L-shaped sleeve having an axially extending cylindrical surface and an upstanding, radially extending outer wall, is applied up against the backplate of the seal ring such that its axially extending cylindrical surface retracts (or raises) the lip portion of the seal into an at rest, non-deployed position. The radial extent of the outer wall of this sleeve is less than the diameter of the seal ring, and thus will not engage with the end plate or housing body of the machine.

The seal ring is installed into the gap about the shaft, the sleeve serving to center the seal ring in the gap and prevent the lip from becoming damaged or deformed during installation. The seal ring becomes fitted about the shaft in the shaft housing of the machine by an interference fit of the seal ring containment wall with the inner diameter surface of the shaft housing. Upon installation of the seal ring about the shaft and in the shaft housing, the sleeve is removed, such that the lip seal is deployed against the surface of the shaft, and this sleeve may then be discarded.

The sleeve is self-centered and self-supported upon the seal ring by virtue of a cantilever effect, making use of the L-shape of the sleeve. Thus, the flex of the lip end of the seal against the axially extending cylindrical surface portion of the sleeve biases the front-facing surface of the sleeve outer wall against the backplate to which it is pressed, and together these forces on the sleeve hold the L-shaped sleeve in place, concentric about the shaft.

In a further embodiment of the invention, a register step may be formed at the back end of the cylindrical surface of the sleeve to align the sleeve onto the seal ring by having the step engage with the inner diameter of the backplate of the seal ring.

In a second aspect of the invention, there is provided a seal cartridge in the form of a ring containing at least two back-to-back annular lipped seals or lip seals. The seal ring is formed with an inboard, radial front wall connected to an axially extending containment wall, which serves as the outer diameter wall surrounding the series of lip seals carried by the ring, and ending with an outboard radially extending back wall. The back wall extends radially inward in parallel with the annular extent of the lip seals to a point short of the radial extent to which the lip portions of the seal will extend into contact with the shaft.

A first, generally L-shaped sleeve having an axially extending cylindrical surface and an upstanding, radially extending outer wall, is applied up against the back wall of the seal ring such that its axially extending cylindrical surface retracts (or raises) the lip portion of the outboard seal or seals into an at rest, non-deployed position. The radial extent of the outer wall of this first sleeve is less than the diameter of the seal ring, and thus will not engage with the end plate or housing body of the machine.

A second, generally L-shaped sleeve, also having an axially extending cylindrical surface, elongated relative to the cylindrical surface of the first sleeve, and a radially extending back wall, is fitted up against the back of the first sleeve so as to place the lip end of the inboard seal in a similarly raised or retracted position.

With both the first and second sleeves applied to the seal cartridge, the seal ring is installed into the gap about the shaft, the sleeves serving to center the seal ring in the gap and prevent the lips from becoming damaged or deformed during installation. The seal ring becomes fitted about the shaft in the shaft housing of the machine by an interference fit of the seal ring containment wall with the inner diameter surface of the shaft housing. Upon installation of the seal ring about the shaft and in the shaft housing, the second, innermost sleeve is removed, such that the inboard lip seal is deployed against the surface of the shaft, and this second sleeve may then be discarded. The first sleeve is retained with the thus installed seal ring until such time as the inboard seal wears to the point of a detectable leakage. Upon detection of leakage past the inboard seal, the first sleeve is retracted to thus deploy, as a back-up, the next outboard or remaining outboard lip seal. In accordance with the invention, it is expected that the wear life of the thus deployed, next or remaining outboard seal will be longer than the preceding seals wear life because each preceding seal will, even though worn, nonetheless provide some level of damming against leakage and thus reduce pressure against the next adjacent outboard seal. When the last outboard seal has been deployed, the first sleeve will become removed from the seal ring and may be discarded.

The sleeves are self-centered and self-supported upon the seal ring by virtue of a cantilever effect, making use of the L-shape of the sleeve. Thus, the flex of the lip end of the seals against the axially extending cylindrical surface portion of the sleeve biases the front-facing surface of the sleeve back wall against the back wall to which it is pressed, and together these forces on the sleeve hold the L-shaped sleeve in place, concentric about the shaft.

According to another embodiment of the invention, the first sleeve is fitted with an outboard seal lip to exclude atmospheric contaminants and the second sleeve also serves to hold the excluder seal in a retracted position until after the seal cartridge has been installed about the shaft and the second sleeve is removed.

In a still further embodiment of the invention, a register step may be formed at the back end of the cylindrical surface of the first sleeve to align the first sleeve onto the seal ring by having the step engage with the inner diameter of the back wall of the seal ring.

Numerous other advantages and features of the present disclosure will become readily apparent from the following detailed description and the embodiments thereof.

BRIEF DESCRIPTIONS OF THE DRAWINGS

So that those having ordinary skill in the art to which the subject matter of the present disclosure pertains will more readily understand how to construct and use the present invention sleeve-type installation and deployment system for lip seals, reference may be had to the following drawings, wherein.

DETAILED DESCRIPTION OF THE PREFERRED EMBODIMENTS

The invention will now be further described by way of specific embodiments thereof, with the understanding that the present disclosure is to be considered as an exemplification of the principles of the invention.

Figure 1:
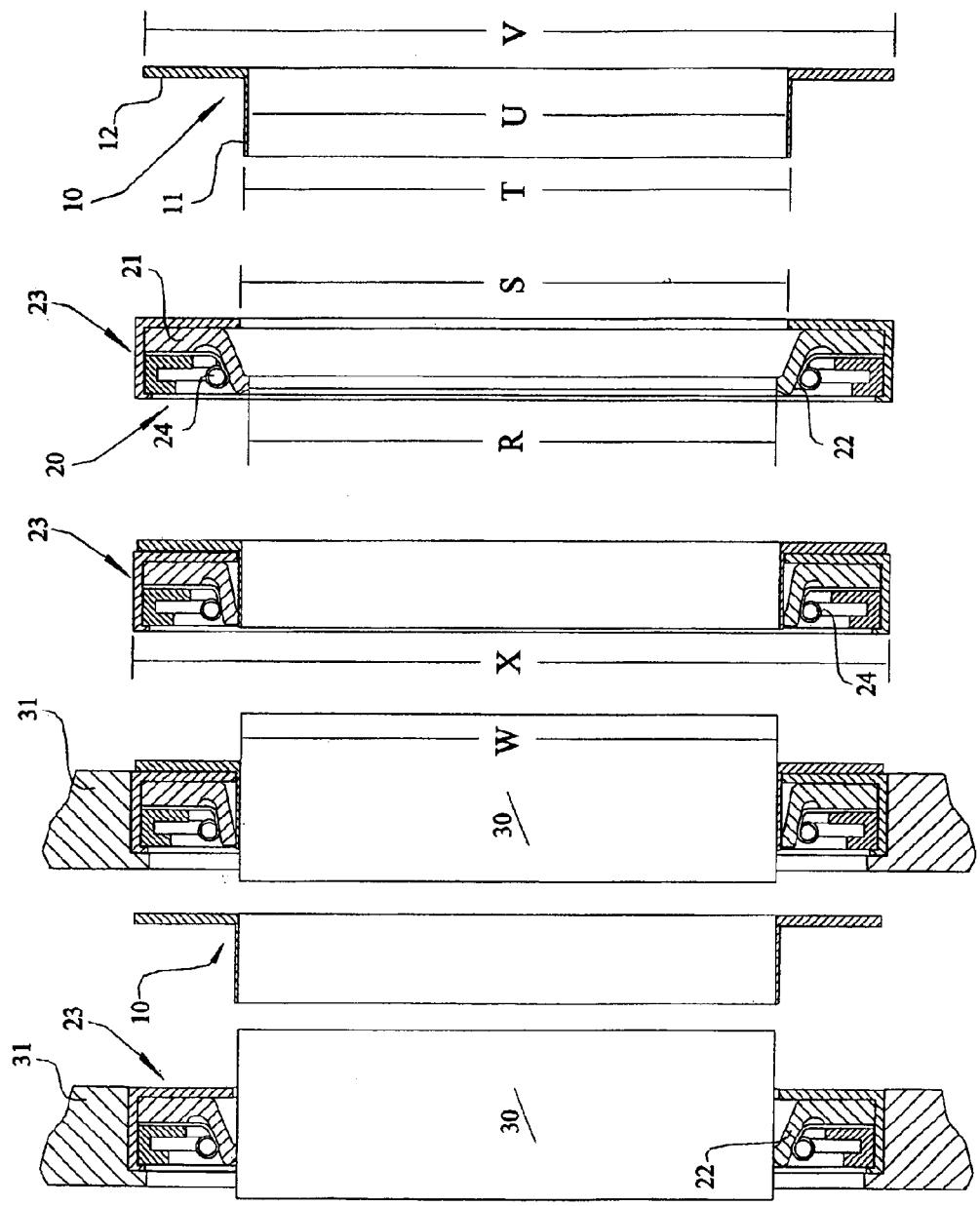
FIG. 1 is a diagrammatical sectional view of a lip seal cartridge showing a sleeve applied for supporting the seal in a retracted, non-deployed position, installation of the thus arranged lip seal into the gap of the shaft housing about a shaft, and the sleeve removed to deploy the lip seal.

FIG. 1 illustrates the application of a sleeve 10, called the installation sleeve, to a lip seal cartridge 20, containing an annular lip seal 21 having an interiorly directed flexible lip portion 22. The lip seal cartridge 20 is fitted within the gap opening between a shaft 30 and a machine housing, casing, gland or other stationary structure 31, for the purpose of sealing the gap about the shaft against fluid leakage. For example, the shaft 30 may be a rotating shaft in an automotive apparatus, such as an engine, a transmission, a transaxle, or a gear box. Also, for example, the shaft 30 may be a reciprocating shaft in a piston-cylinder pump or motor apparatus.

As shown in FIG. 1, the installation sleeve 10 is L-shaped having an inwardly axially extending cylindrical surface 11. At the back or outboard end of the cylindrical surface 11 is a radially upstanding back wall 12.

The lip seal cartridge 20 is an annular member, for extending concentrically about the shaft 30. The seal cartridge is encased about its outer diameter by a seal ring 23 having a front end defined by a radial front wall, an axially directed containment wall, and a radially directed backplate which is short of and thus provides a space between its inner diameter and the outer diameter of the shaft 30. The seal ring 23 contains the lip seal 21. The lip seal has a general L-shaped profile with the flexible lip portion tensioned, such as by a garter spring 24, to rest against the outer diameter of the shaft 30. Thus, the flexible lip portion of each seal has an inside diameter selected to be smaller (in its operational state) than the outside diameter of the shaft 30. The lip seal cartridge, in use, is fixedly held by virtue of an interference fit with the inner diameter of the structure 31, such that the flexible lip portion of the seal will be deployed against the outer surface of the shaft as permitted in accordance with the invention.

As shown in FIG. 1, the purpose of the installation sleeve is to first be fitted up against the backplate of the cartridge seal ring, such that the cylindrical surface 11 of the sleeve passes interiorly of the seal ring backplate and beneath the seal so as to raise the flexible lip portion 22 of the seal up and away from possible contact with the shaft. The installation sleeve is fitted to the cartridge seal ring such that the front face of the upstanding wall 12 of the sleeve butts up against the backplate of the seal ring. The contact between the upstanding wall 12 of the sleeve and the backplate of the seal ring serves to register placement of the installation sleeve, and also serves to align the elevation of the flexible lip by the cylindrical surface 11. Such alignment is brought about by a cantilever action utilizing the L-shape of the installation sleeve. Thus, when assembled with the lip seal cartridge, the flexible lip portion 22 of the seal presses radially inward on the outer diameter of the cylindrical surface 11 of the sleeve, but at the same time, the cylindrical surface is held level above the shaft by virtue of the upstanding wall 12 abutting against the backplate of the seal ring 23. The seal cartridge is then installed in the machine housing, as shown in the left-hand portion of FIG. 1.

With the sleeve thus assembled to the lip seal cartridge, and the sealing lip of the seal elevated out of engagement with the outer diameter of the shaft, the seal ring is then applied to the gap between the shaft 30 and housing structure 31, and press fit into the gap where the seal ring will then be held in place. Upon installation of the seal ring into the annular gap, the installation sleeve is then axially withdrawn, whereupon the lip seal is deployed such that its flexible lip sealingly engages the outer diameter of the shaft 30.

It is contemplated by this invention that the installation sleeve may be made of metal, preferably aluminum, or a rigid plastic. It is also contemplated that the upper end of the upstanding wall of the sleeve may be formed with recesses or other forms of grips to facilitate its manual withdrawal from the seal cartridge. It will be further noted that, in accordance with this invention, the radial extent of the upstanding wall of the sleeve is short of and does not reach the outer diameter of the cartridge seal ring. Since registration and alignment of the sleeve in assembling to the seal cartridge is brought about by the above-discussed cantilevered action, there is no need to extend the upstanding wall further outwardly or to use further devices for registering with the surfaces of the machine housing 31.

Figure 2:
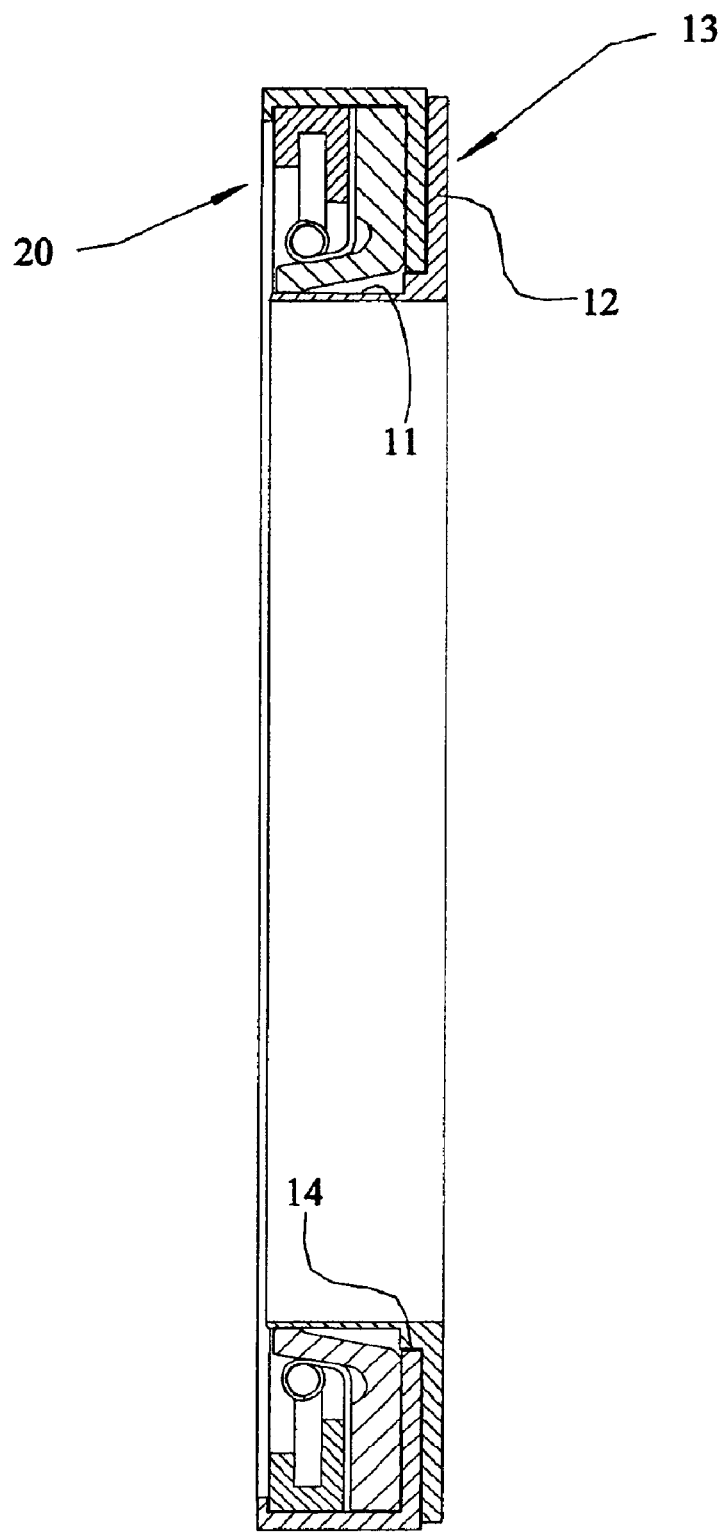
FIG. 2 is a diagrammatical sectional, view of the lip seal cartridge illustrating a stepped form of the sleeve.

FIG. 2 shows a further embodiment of an installation sleeve 13 in which a step register 14 is utilized. The step 14 is disposed at the inside corner between the cylindrical surface and upstanding back wall 12. The purpose of the step 14 is to coincide with the inside diameter of the backplate of the cartridge seal ring 23 when the installation sleeve is assembled to the seal cartridge with the front face of the sleeve back wall abutting against the back face of the seal casing backplate. The step 14 serves to further centralize and register the installation sleeve on the seal cartridge and about the shaft 30, during installation of the seal cartridge. The installation sleeve 13, even with the step 14, functions in accordance with the inventive operation as described above in connection with FIG. 1.

Figure 3:
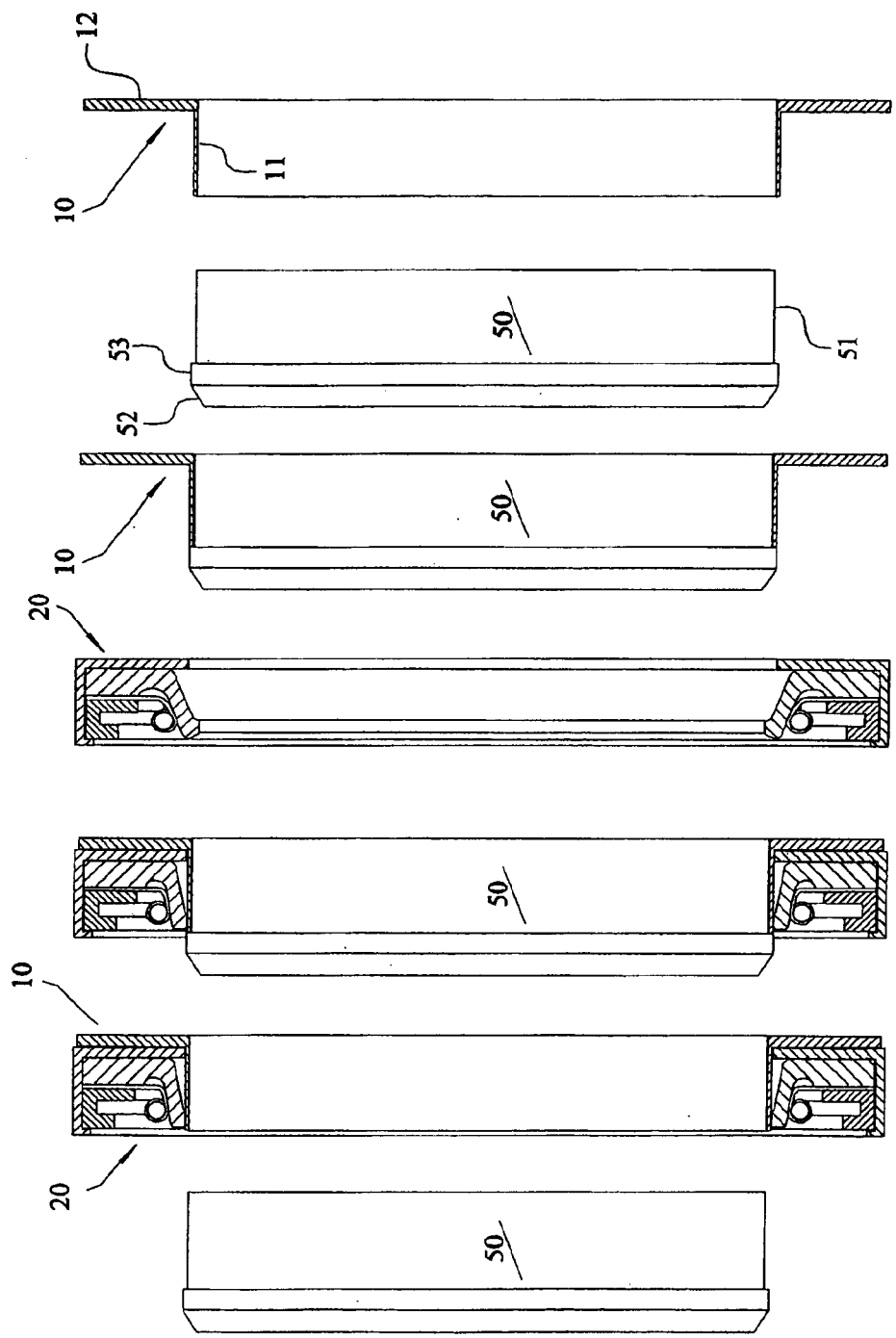
FIG. 3 is a diagrammatical sectional view of the lip seal cartridge illustrating how the sleeve would be installed into position, prior to being shipped, and made ready for installation of the seal cartridge into the gap.

With reference to FIG. 3, there is shown, proceeding from right to left, a system by which the installation sleeve can be installed into position with the lip seal cartridge 20, prior to shipment of the full assembly which would then be ready for installation. For applying the sleeve 10 to the interior space of the lip seal cartridge 20, there is provided an appropriately notched circular plug 50 having a reduced diameter back end 51 preceded by a frustoconical lead surface 52 and a constant diameter mid-surface 53 from which the reduced diameter end is notched down. The outer diameter of the back surface 51 receives the cylindrical surface portion of the sleeve in concentric fashion. The plug is then moved forward through the interior central space defined by the seal cartridge. The sleeve then assembles to the seal cartridge, when the upstanding wall of the sleeve abuts against the backplate of the cartridge, whereupon the plug continues to pass through the central space of the seal cartridge. This leaves the sleeve in place, centrally disposed with respect to the seal cartridge and engaging with the flexible lip portion of the lip seal to elevate the lip out of contact with the shaft about which the seal cartridge will be installed, until the sleeve is withdrawn and the lip seal deployed against the outer diameter of the shaft.

A more particular understanding of the dimensions and tolerances in the construction and assembly of the above-described sleeve arrangement may be had from the following description of dimensions from an illustrative construction. With reference to FIG. 1, the indicated dimensions, in inches, are as follows:

Shaft diameter W=1.625

Interior lip diameter in its relaxed state R=1.560

Inside diameter of the backplate of the seal casing S=1.670

Outside diameter of the installation sleeve cylindrical surface T=1.667

Inside diameter of the installation sleeve cylindrical surface U=1.630

Outside diameter of the installation sleeve back wall V=2.50

Outside diameter of the cartridge seal casing X=2.80.

In the context of such an embodiment as noted here, the outside diameter of the step 14, described in connection with FIG. 2, would be 0.003 inches less than the inside diameter of the backplate of the lip seal cartridge to which a stepped register installation sleeve is applied.

Figure 4:
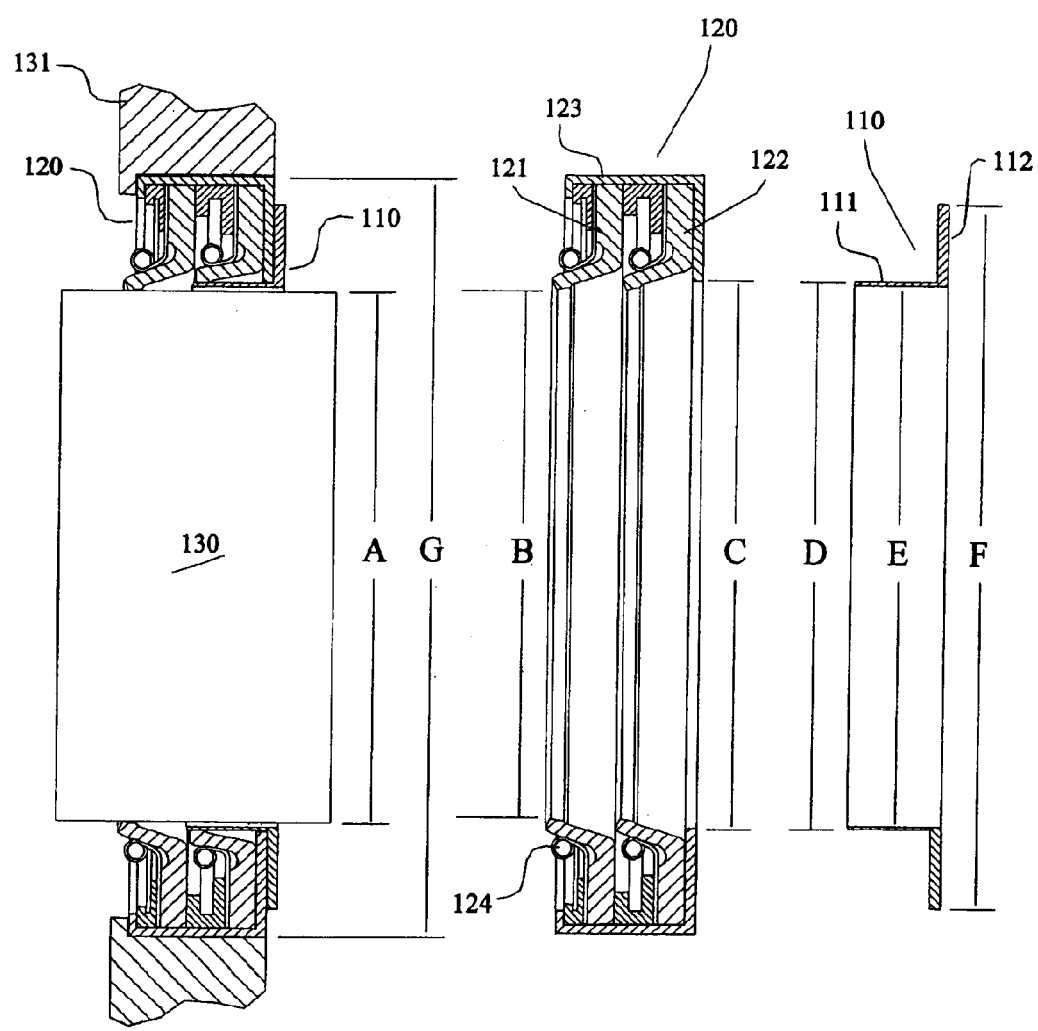
FIG. 4 is a diagrammatical sectional view of a multiple lip seal cartridge to which a first sleeve is applied for supporting the outboard seal in a retracted, non-deployed position.

Turning to a further aspect of this invention, FIG. 4 illustrates the application of a first sleeve 110, called the deployment sleeve, to a lip seal cartridge 120, containing multiple, axially consecutive lip seals, here two lip seals, an inboard lip seal 121 and an outboard lip seal 122. The lip seal cartridge 120 is fitted within the gap opening between a shaft 130 and a machine housing, casing, gland or other stationary structure 131, for the purpose of sealing the gap about the shaft against fluid leakage. For example, the shaft 130 may be a rotating shaft in an automotive apparatus, such as an engine, a transmission, a transaxle, or a gearbox. Also, for example, the shaft 130 may be a reciprocating shaft in a piston-cylinder pump or motor apparatus.

As shown in FIG. 4, the deployment sleeve 110 is L-shaped having an inwardly axially extending cylindrical surface 111. At the back or outboard end of the cylindrical surface 111 is a radially upstanding back wall 112.

The lip seal cartridge 120 is an annular member, for extending concentrically about the shaft 130. The seal cartridge is encased about its outer diameter by a seal ring 123 having a front end defined by a radial front wall, an axially directed containment wall, and a radially directed backplate which is short of and thus provides a space between its inner diameter and the outer diameter of the shaft 130. The seal ring 123 contains the pair of annular lip seals 121 and 122, each of which has a general L-shaped profile with a flexible lip portion tensioned, such as by a garter spring 124 to rest against the outer diameter of the shaft 130. Thus, the flexible lip portion of each seal has an inside diameter selected to be smaller (in its operational state) than the outside diameter of the shaft 130. The lip seal cartridge, in use, is fixedly held by virtue of an interference fit with the inner diameter of the structure 131, such that the flexible lip portions of the seals may be deployed against the outer surface of the shaft as permitted in accordance with the invention.

As shown in FIG. 4, the purpose of the deployment sleeve is to first be fitted up against the backplate of the cartridge seal ring, such that the cylindrical surface 111 of the sleeve passes interiorly of the seal ring backplate and beneath the outboard seal 122 so as to raise the flexible lip portion of the outboard seal up and away from possible contact with the shaft. The deployment sleeve is fitted to the cartridge seal ring such that the front face of the upstanding wall 112 of the sleeve butts up against the backplate of the seal ring. The contact between the upstanding wall 112 of the sleeve and the backplate of the seal ring serves to register placement of the deployment sleeve, and also serves to align the elevation of the flexible lip by the cylindrical surface 111. Such alignment is brought about by a cantilever action utilizing the L-shape of the deployment sleeve. Thus, when assembled with the lip seal cartridge, the flexible lip portion of the outboard seal 122 presses radially inward on the outer diameter of the cylindrical surface 111 of the sleeve, but at the same time, the cylindrical surface is kept from pressing inward against the shaft by virtue of the upstanding wall 112 abutting against the backplate of the seal ring 123. With the seal cartridge installed in the machine housing, as shown in the left-hand portion of FIG. 4, the deployment serves to stow the outboard seal, while not affecting deployment of the inboard seal.

Figure 5:
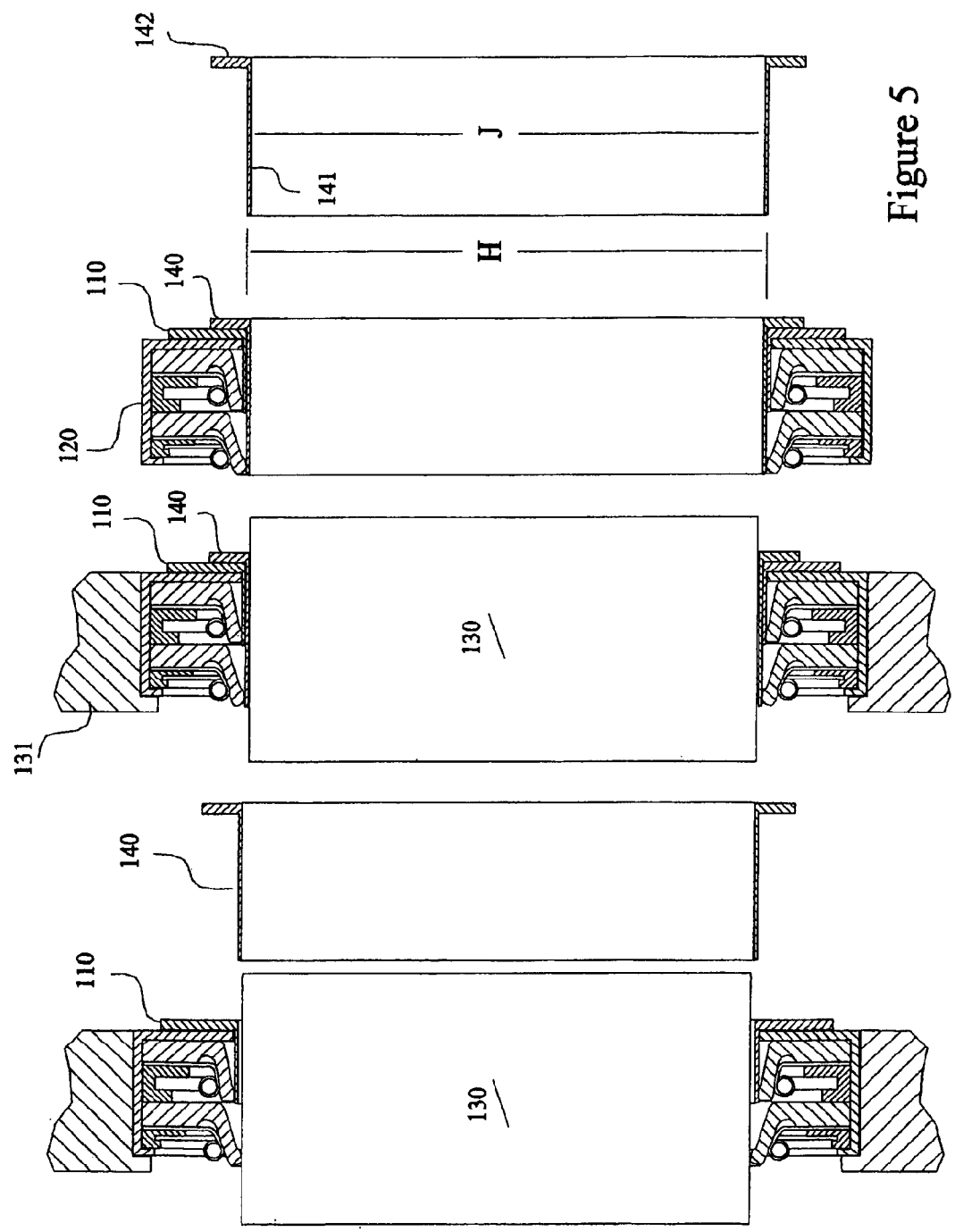
FIG. 5 is a diagrammatical sectional view of application of a second sleeve to the multiple lip seal cartridge and installation of the thus arranged lip seal cartridge into the gap of the shaft housing about the shaft, whereupon the second sleeve is removed to deploy the inboard lip seal.

As illustrated in FIG. 5, the invention includes a second sleeve 140, called the installation sleeve, which is also L-shaped, having an elongated, axially extending cylindrical surface 141 and an upstanding end wall 142. Proceeding from right to left in FIG. 5, the installation sleeve 140 is applied behind the deployment sleeve 110, such that the end wall 142 butts up against the back wall 112 of the deployment sleeve and the cylindrical surface 141 extends beneath the cylindrical surface 111 of the deployment sleeve and extends axially inward of the deployment sleeve. The inward end of the installation sleeve serves to raise the sealing lip of the inboard seal of the cartridge 120, the installation sleeve becoming registered and aligning with the deployment sleeve, as discussed above in connection with the deployment sleeve. With the sleeves thus assembled to the lip seal cartridge, and the sealing lips of the seals elevated out of engagement with the outer diameter of the shaft, the seal ring is then applied to the gap between the shaft 130 and housing structure 131, and press fit into the gap where the seal ring will then be held in place. Upon installation of the seal ring into the annular gap, the installation sleeve is then axially withdrawn, whereupon the inboard lip seal is deployed such that its flexible lip sealingly engages the outer diameter of the shaft 130. The withdrawn sleeve may then be removed from around the shaft and discarded, without breaking down the machine, by splitting the sleeve or, preferably, breaking apart the sleeve at an axial weakness line (not shown).

At the stage of operation depicted in the left-hand portion of FIG. 5, the inboard seal in the seal cartridge 120 is operational. The outboard seal is held in reserve, not being in contact with the shaft, by virtue of the deployment sleeve which remains with the thus installed seal cartridge. When the inboard seal becomes worn to the point that leakage is detectable from the gap, such as visually, then the deployment sleeve may be withdrawn from the seal cartridge, in the manner of the installation sleeve, so as to now deploy the outboard seal and thus continue sealing off the gap. It is contemplated by this invention that the wear life of the outboard seal will be greater than the wear life of the inboard seal because the inboard seal, even though previously deployed and worn, will serve to reduce leakage pressure acting on the outboard seal.

It is contemplated by this invention that either or both of the deployment and installation sleeves may be made of metal, preferably aluminum, or a rigid plastic, such as Acrylic. Also, since plastic is typically more brittle than metal, sleeves made of plastic will be easier to break once removed from the seal cartridge. It is also contemplated that the upper ends of the upstanding walls of the sleeves may be formed with recesses or other forms of grips to facilitate their manual withdrawal from the seal cartridge. It will be further noted that, in accordance with this invention, the radial extent of the upstanding walls of the sleeves is short of and does not reach the outer diameter of the cartridge seal ring. Since registration and alignment of the sleeve in assembling to the seal cartridge is brought about by the above-discussed cantilevered action, there is no need to extend the upstanding wall further outwardly or to use further devices for registering with the surfaces of the machine housing 131.

Figure 6:
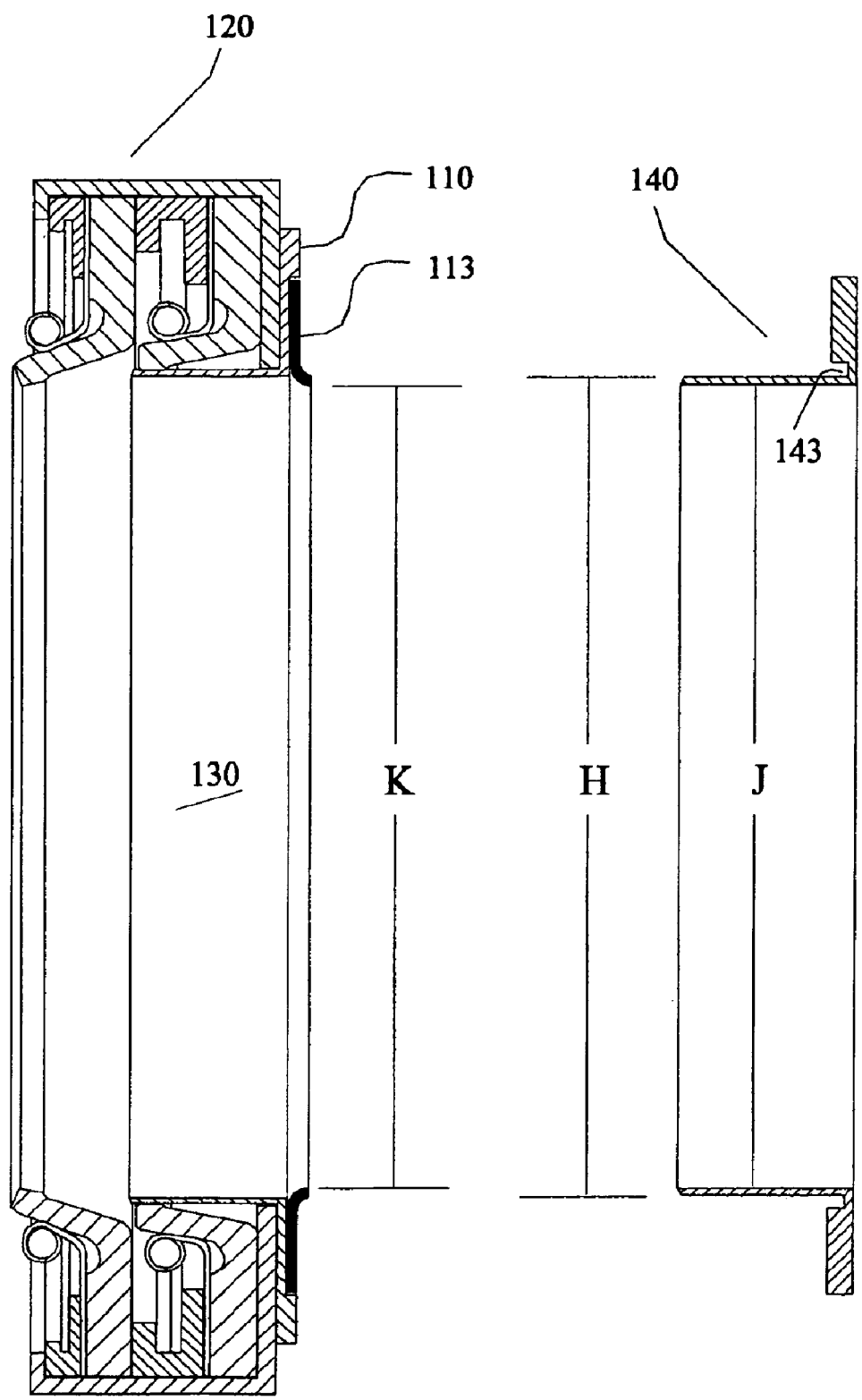
FIG. 6 is a diagrammatical sectional view of the lip seal cartridge showing the use of a seal lip at the back wall of the first sleeve and how the second sleeve serves to hold this back wall lip against extension and deployment until removal of the second sleeve upon installation of the seal ring in the gap.

As a further embodiment of the sleeves arrangement discussed above, FIG. 6 shows a version of the deployment sleeve wherein a lip seal 113 is affixed to the back face of the upstanding back wall of the deployment sleeve 110. The lip seal 113 is oriented such that when deployed, as shown in FIG. 6, its flexible lip portion will engage with the outer diameter of the shaft 130. Thus, the lip seal 113 serves to exclude the possibility of atmospheric contaminants, such as dust, salt, water, etc., from entering the lip seal cartridge 120, more particularly, the space between the inboard and outboard seals and also the area of the shaft where the outboard seal will rest once deployed.

The excluder seal 113 is preferably bonded to a recess in the back face of the back wall of the deployment sleeve 110. During installation, the installation sleeve is a modified version 140 which operates as before with respect to the deployment sleeve 110, except that when the excluder seal 113 is present, the cylindrical surface 141 of the installation sleeve will also serve to elevate the lip portion of seal 113 and a recess 143 is formed in the back wall of the sleeve 140 to accommodate the lip portion of seal 113. When the installation sleeve is removed to deploy the inboard seal, withdrawal of the sleeve will also deploy the excluder seal 113.

Figure 7:
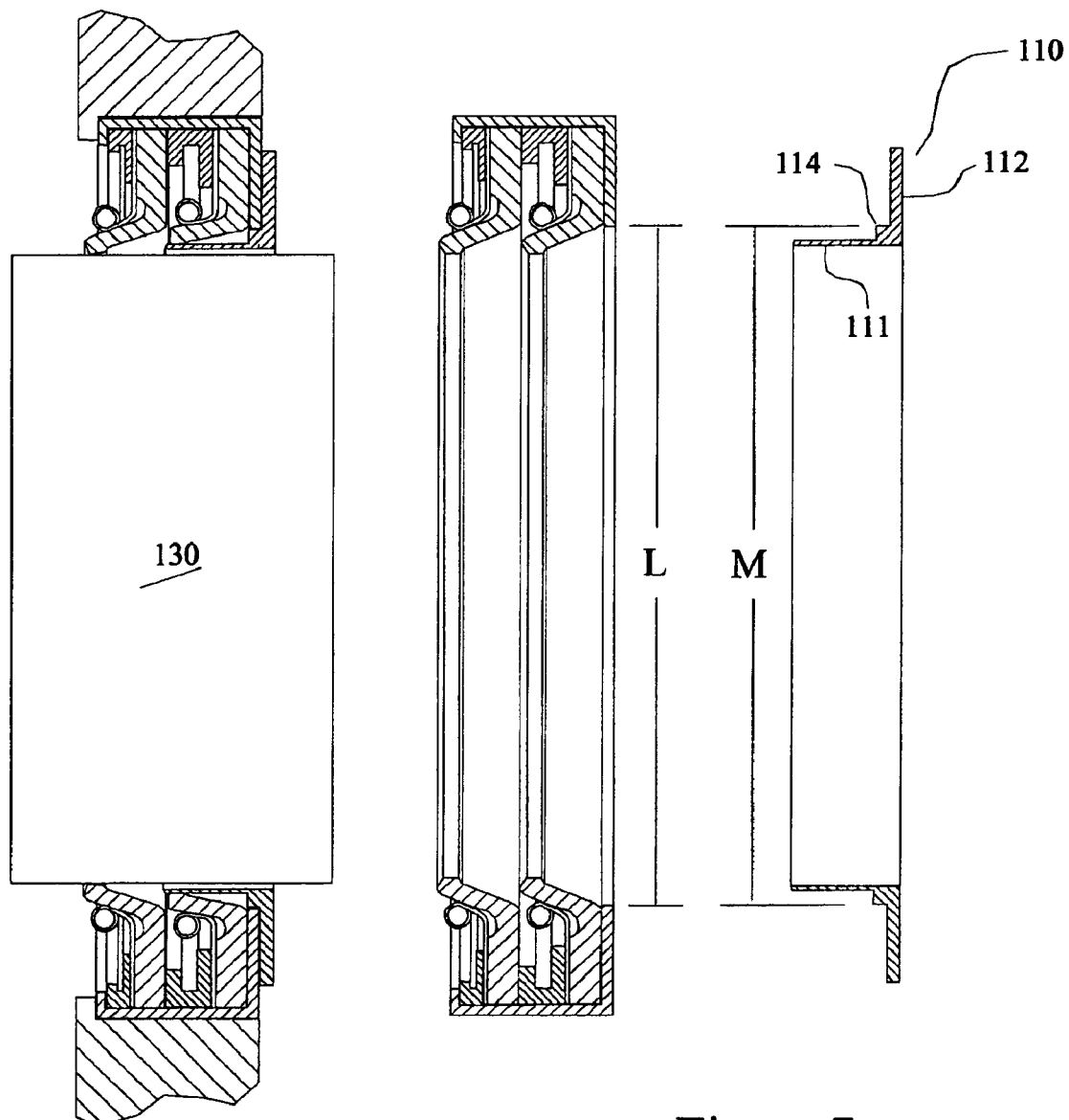
FIG. 7 is a diagrammatical sectional, partial view of the lip seal cartridge illustrating a stepped form of the first sleeve.

FIG. 7 shows a still further embodiment of the deployment sleeve 110 in which a step register 114 is utilized. The step 114 is disposed at the inside corner between the cylindrical surface and upstanding back wall 112. The purpose of the step 114 is to coincide with the inside diameter of the backplate of the cartridge seal ring 123 when the deployment sleeve is assembled to the seal cartridge with the front face of the sleeve back wall abutting against the back face of the seal casing backplate. The step 114 serves to further centralize and register the deployment sleeve on the seal cartridge and about the shaft 130, during installation of the seal cartridge and during operation of the cartridge seal up until the deployment sleeve is withdrawn. Otherwise, the deployment sleeve 110, even with the step 114, functions in accordance with the inventive operation as described above in connection with FIGS. 4 and 5.

Figure 8:
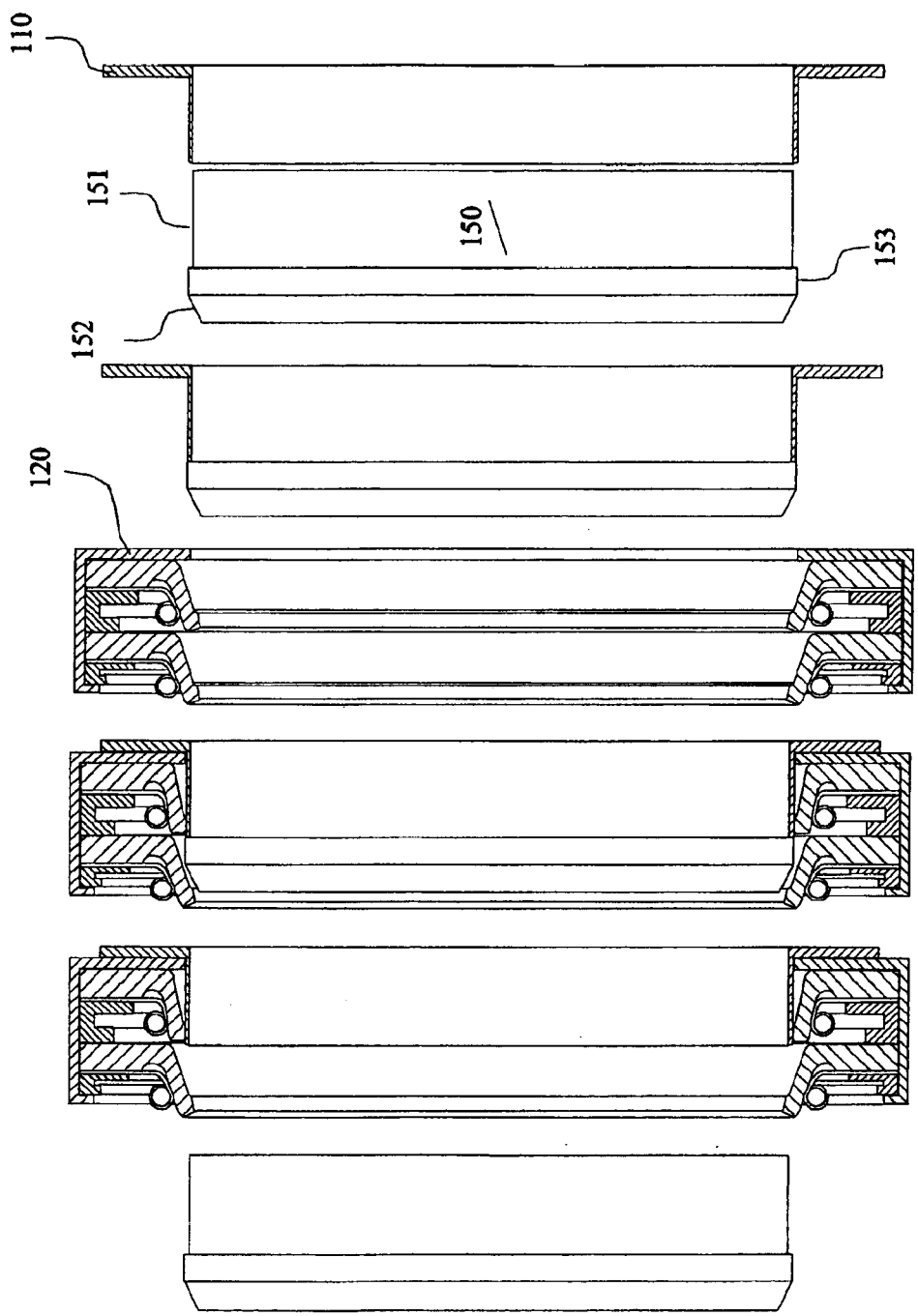
FIG. 8 is a diagrammatical sectional view of the lip seal cartridge illustrating, with the first sleeve, how the sleeves would be installed into position, prior to being shipped, and made ready for installation of the seal cartridge into the gap.

Finally, with reference to FIG. 8, there is shown, proceeding from right to left, a system by which the deployment or installation sleeve can be installed into position with the lip seal cartridge 120, prior to shipment of the full assembly which would then be ready for installation. For applying the sleeves, the deployment sleeve 110 being shown as the example in FIG. 8, to the interior space of the lip seal cartridge, there is provided an appropriately notched circular plug 150 having a reduced diameter back end 151 preceded by a frustoconical lead surface 152 and a constant diameter mid-surface 153 from which the reduced diameter end is notched down. The outer diameter of the back surface 151 receives the cylindrical surface portion of the sleeve in concentric fashion. The plug is then moved forward through the interior central space defined by the seal cartridge. The sleeve then assembles to the seal cartridge, when the upstanding wall of the sleeve abuts against the backplate of the cartridge, or the upstanding back surface of a preceding sleeve, whereupon the plug continues to pass through the central space of the seal cartridge. This leaves the sleeve in place, centrally disposed with respect to the seal cartridge and engaging with the flexible lip portions of the lip seals to elevate the lips out of contact with the shaft about which the seal cartridge will be installed, until the sleeve is withdrawn and the lip seal deployed against the outer diameter of the shaft.

A more particular understanding of the dimensions and tolerances in the construction and assembly of the above-described two sleeve arrangement may be had from the following description of dimensions take from a sample construction which the inventor has tested and found satisfactory. With reference to FIGS. 4–6, the indicated dimensions, in inches, are as follows:

Shaft diameter A=1.625
Interior lip diameter in its relaxed state B=1.560
Inside diameter of the backplate of the seal casing C=1.720
Outside diameter of the deployment sleeve cylindrical surface D=1.717
Inside diameter of the deployment sleeve cylindrical surface E=1.670
Outside diameter of the deployment sleeve back wall F=2.50
Outside diameter of the cartridge seal casing G=2.80
Outside diameter of the installation sleeve cylindrical surface H=1.667
Inside diameter of the installation sleeve cylindrical surface J=1.628
Interior lip diameter of the excluder seal in its relaxed state K=1.615.

In the context of such an embodiment as noted here, the outside diameter M of the step 114, described in connection with FIG. 7, would be 0.003 inches less than the inside diameter L of the backplate of the lip seal cartridge to which a stepped register deployment sleeve is applied.

While the present disclosure provides detailed descriptions with reference to the preferred embodiments, it is to be understood that various modifications and changes may be made in the construction, arrangement and operation of the sleeves installation and deployment lip seal system disclosed herein without departing from the spirit and scope of the invention as defined by the appended claims and reasonable equivalents thereof. For example, it is contemplated that all the seal and sleeve dimensions described above in connection with a specific embodiment can vary, depending upon the particular application of the invention. It is further contemplated that the sealing interference between the excluder seal and the outside diameter of the shaft would, in operation, be relatively light, as there is only atmospheric pressure to seal. It is also contemplated that a compatible grease lubricant may be packed into all the cavities of the sleeve-assembled seal cartridge prior to shipping.

What is claimed is:

1. A lip seal cartridge for sealing a region between a shaft and surrounding structure, comprising:

a. a seal ring having a front end and a back end, the seal ring annularly encasing a plurality of lip seal, each of the lip seals being biased radially inwardly toward the shaft and at least one of the plurality of lip seals being selectively engageable with the shaft;

b. a lip seal deployment sleeve axially aligned with the seal ring, the lip seal deployment sleeve comprising an annular barrier separating at least one of the plurality of lip seal from the shaft when the lip seal deployment sleeve is in an initial position, the lip seal deployment sleeve being axially movable along the shaft away from the initial position, whereupon the annular barrier ceases to separate one of the plurality of lip seals from the shaft, thereby enabling the lip seal to engage the shaft;

c. an installation sleeve having an annular barrier disposed between the shaft and all of the plurality of lip seals, including those initially separated from the shaft by the lip seal deployment sleeve, the annular barrier of the installation sleeve being further disposed between the shaft and the annular barrier of the lip seal deployment sleeve; and d. the installation sleeve being axially removable from the lip seal cartridge, whereupon the shaft is engaged by any of the plurality of lip seals not initially separated from the shaft by the lip seal deployment sleeve.

2. The lip seal cartridge of claim 1, further comprising:

a. a radially directed backplate of the seal ring, the backplate having a central opening therein with a diameter spaced axially outwardly from an outer diameter of the shaft; and b. an upstanding wall of the installation sleeve, the upstanding wall having a front face abutting the backplate of the seal ring when the installation sleeve is in the initial position.

wherein the installation sleeve comprises an upstanding end wal, the upstanding end wall abutting the upstanding wall of the lip seal deployment sleeve prior to axial removal of the installation sleeve.

3. The lip seal cartridge of claim 1, wherein at least one of the annular barrier of the lip seal deployment sleeve and the annular barrier of the installation sleeve comprises a rigid plastic material.

4. The lip seal cartridge of claim 3, wherein the rigid plastic material comprises Acrylic.

* * * * *

UNITED STATES PATENT AND TRADEMARK OFFICE
CERTIFICATE OF CORRECTION

PATENT NO. : 7,059,608 B2 Page 1 of 1
APPLICATION NO. : 10/387730
DATED : June 13, 2006
INVENTOR(S) : Thomas W. Ramsay It is certified that error appears in the above-identified patent and that said Letters Patent is hereby corrected as shown below:

In the Claims:

At Column 10, line 21, "seal" should be -- seals --.

At Column 10, line 55, "position." should be -- position; --.

At Column 10, line 57, "wal" should be -- wall --.

Signed and Sealed this

Fifteenth Day of April, 2008

JON W. DUDAS
*Director of the United States Patent and Trademark Office*